United States Patent [19]

Hlava

[11] Patent Number: 5,197,690
[45] Date of Patent: Mar. 30, 1993

[54] DRAG ACTUATION STRUCTURE FOR FISHING REEL

[75] Inventor: Lorens G. Hlava, Tulsa, Okla.

[73] Assignee: Zebco Corporation, Tulsa, Okla.

[21] Appl. No.: 547,632

[22] Filed: Jul. 2, 1990

[51] Int. Cl.⁵ ............................................ A01K 89/027
[52] U.S. Cl. ................................................... 242/244
[58] Field of Search ............. 242/244, 245, 246, 234, 242/235, 236, 237, 238, 239

[56] References Cited

U.S. PATENT DOCUMENTS

| | | | |
|---|---|---|---|
| 2,085,815 | 7/1987 | McCollum | 254/343 |
| 2,521,543 | 9/1950 | Shakespeare | 242/235 |
| 2,667,312 | 1/1954 | Denison | 242/240 |
| 2,896,874 | 7/1959 | Nurmse | 242/266 |
| 3,093,340 | 6/1963 | Mauborgne | 242/236 |
| 3,123,318 | 3/1964 | Wood | 242/239 |
| 3,141,629 | 7/1964 | Rouanet | 242/244 |
| 3,322,371 | 5/1967 | Rouanet | 242/244 |
| 3,351,301 | 11/1967 | Bretton | 242/235 |
| 3,675,502 | 7/1972 | Sarah | 74/369 |
| 3,697,011 | 10/1972 | Christensen et al. | 242/225 |
| 3,697,012 | 10/1972 | Walker | 242/225 |
| 3,814,349 | 6/1974 | Menne | 242/264 |
| 4,343,442 | 8/1982 | Andersson | 242/244 |
| 4,408,729 | 10/1983 | Moss et al. | 242/244 |
| 4,431,143 | 2/1984 | Moss et al. | 242/244 |
| 4,496,115 | 1/1985 | Kreft et al. | 242/306 |
| 4,778,120 | 10/1988 | Finney | 242/244 |

Primary Examiner—Katherine Matecki
Attorney, Agent, or Firm—Wood, Phillips, Van Santen, Hoffman, & Ertel

[57] ABSTRACT

A drag producing structure in a fishing reel of the type having: a housing with a deck plate and a spool support sleeve projecting from the deck plate; and a line carrying spool assembly mounted on the support sleeve and having a central axis and an associated flange with an axially facing surface, the spool assembly being rotatable relative to the housing to allow payout of line. The inventive structure consists of: a clutch ring having an axially facing surface; structure for mounting the clutch ring to the deck plate so that the spool assembly flange resides between the deck plate and at least a first part of the clutch ring; and structure for urging the first part of the clutch ring selectively towards and away from the spool assembly flange to selectively increase and decrease a captive force on the spool assembly flange to thereby vary the reel drag.

16 Claims, 2 Drawing Sheets

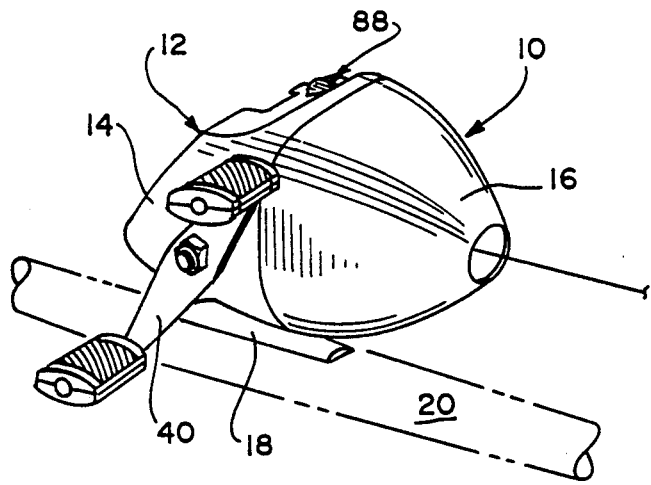
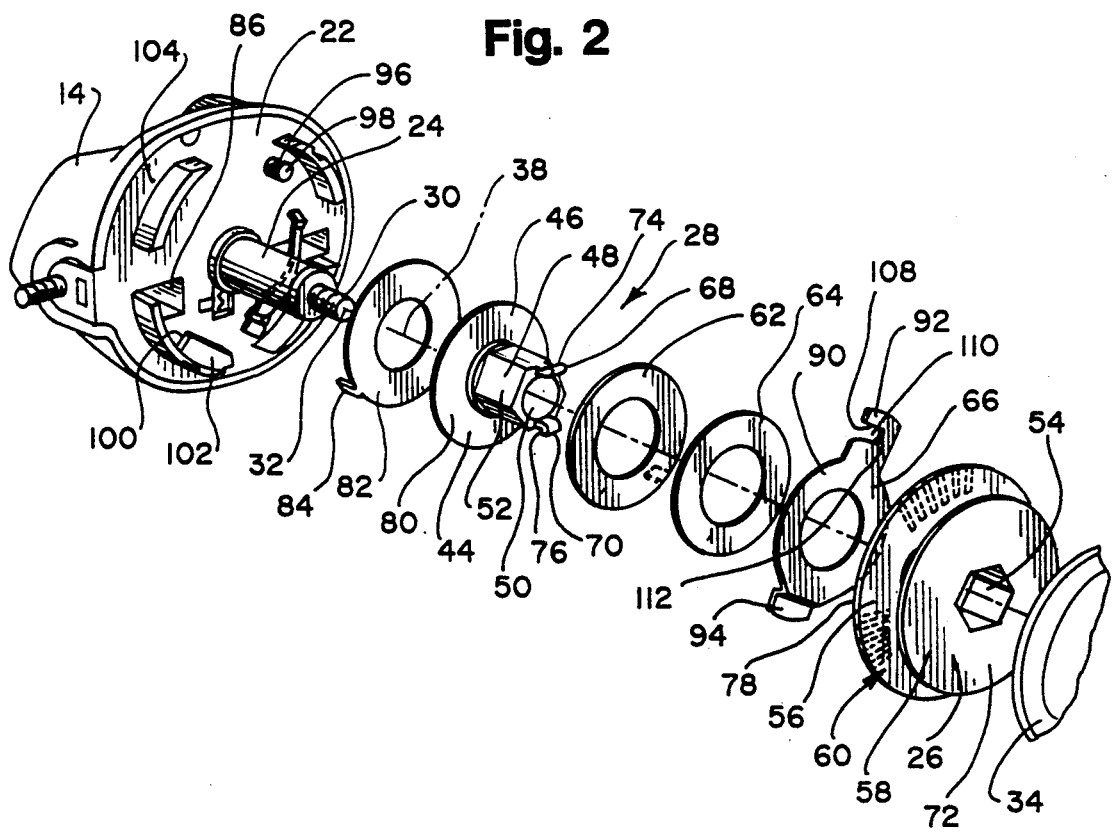

DRAG ACTUATION STRUCTURE FOR FISHING REEL

BACKGROUND OF THE INVENTION

1. Field of the Invention

This invention relates to fishing reels of the type having a line carrying spool that is rotatable relative to a housing on which the spool is mounted to release line and, more particularly, to a structure for producing a variable holding force on the spool to thereby establish the amount of torque that must be exerted on the spool to effect rotation thereof.

2. Background Art

There are a multitude of different drag applying structures in the fishing reel art. It is known, for example, to exert a drag force directly on a surface of the spool, as shown in U.S. Pat. No. 4,408,729, to Moss et al.

It is also known to mount a spool on a carrier and to develop a radial drag force on the spool carrier, rather than directly on the spool. Exemplary structures are shown in each of U.S. Pat. No. 3,141,629, to Rouanet, and U.S. Pat. No. 3,351,301, to Bretton.

It is also known to mount a spool on a carrier and to exert an axial drag force on the carrier, as shown in U.S. Pat. No. 3,814,349, to Menne. Menne requires that the spool be disassembled to access a drag control knob which is used to vary the axial drag force on the spool carrier.

Another type of prior art drag producing structure is shown in U.S. Pat. No. 4,343,442, to Andersson. Andersson employs a spool carrier and a drag producing element that bears on a flange of the drag carrier to develop a variable drag force. Andersson has a relatively intricately formed drag producing plate with diametrically opposed forked ends that must be separately engaged with guide pins. The assembly process for the Andersson structure is quite delicate and time consuming. This adds considerably to the time it takes to complete the reel assembly and resultingly the attendant manufacturing costs. Andersson also appears to disclose structure which causes a considerable lag in the drag actuation. That is, one forked end of the drag applying plate as received in a slot that is considerably wider than the forked end of the plate. This structure appears to be necessary to effect assembly of the Andersson structure.

In short, the above structures are relatively complicated. This makes them relatively difficult and expensive to manufacture. At the same time, the large number of parts in the above prior art structures and intricate connections increase the potential for reel failure.

SUMMARY OF THE INVENTION

The present invention is specifically directed to overcoming the above enumerated problems in a novel and simple manner.

The present invention is directed to a drag producing structure in a fishing reel of the type having: a housing with a deck plate and a spool support sleeve projecting from the deck plate; and a line carrying spool assembly mounted on the support sleeve and having a central axis and an associated flange with an axially facing surface, the spool assembly being rotatable relative to the housing to allow payout of line.

The inventive structure consists of: a clutch ring having an axially facing surface; structure for mounting the clutch ring to the deck plate so that the spool assembly flange resides between the deck plate and at least a first part of the clutch ring; and structure for urging the first part of the clutch ring selectively towards and away from the spool assembly flange to selectively increase and decrease a captive force on the spool assembly flange to thereby vary the reel drag.

With the inventive structure, the clutch ring can be securely held to the deck plate and a positive drag force can be developed thereby.

To facilitate assembly of the clutch ring, the deck plate is provided with a wall that defines a seat, bounded by an axially facing surface, for reception of a second part of the clutch ring, with the first and second clutch ring parts preferably being in diametrically opposed relationship.

To minimize potential wear on the deck plate, a metal washer can be interposed between the deck plate and the spool assembly flange.

To facilitate assembly of the clutch ring, the first clutch ring part is provided with a U-shaped seat which cooperates with an axially movable shaft on the clutch ring urging structure. The shaft has an undercut to be straddled by the surface defining the U-shaped seat. With the U-shaped seat and undercut in axial alignment, the clutch ring can be simply rotated about the spool assembly axis to operatively engage the undercut and seat. In a preferred form, the rotation of the clutch ring that engages the U-shaped seat and undercut also drives the second clutch ring part into the seat therefor.

To avoid direct contact between the clutch ring urging structure and spool, as might cause wear on the spool, the spool assembly is made in two parts—a spool carrier and a spool. The spool carrier preferably defines the flange through which the drag force is developed, with the spool preferably releasably attached to the spool carrier.

To facilitate releasable attachment of the spool on the spool carrier, the spool carrier is provided with deflectable fingers which are exposed at the front of the spool and which can be biased towards each other to reduce the effective diameter of the spool carrier at the fingers to permit removal of the spool from the carrier. Ramp surfaces are provided on the fingers so that the fingers are progressively cammed towards each other by the spool as the spool is directed thereover in an axial direction during assembly.

In a preferred form, the drag clutch ring is preferably metal. The clutch ring has an annular body which can be guidingly slid over the spool support sleeve and an offset on the second part of the drag clutch ring for movement into the deck plate seat. Manufacture of the clutch ring then involves a simple stamping operation followed by a bending step on a free end of the clutch ring.

Preferably, the width of the shaft undercut on the clutch ring urging structure and the thickness of the material defining the clutch ring are substantially the same so that with the undercut straddled by the surface surrounding the U-shaped seat on the first clutch ring part, the clutch ring first part will closely follow axial movement of the shaft on the clutch ring urging structure. This avoids any response lag during drag adjustment.

The invention also contemplates a drag clutch ring that can be attached other than directly to the deck plate. Preferably, however, the drag clutch ring is simultaneously operatively connected to any supporting element therefor on the reel and the drag actuator by a simple turning step, as previously described.

BRIEF DESCRIPTION OF THE DRAWINGS

FIG. 1 is a perspective view of a spin cast style fishing reel suitable for incorporation of the present invention;

FIG. 2 is an enlarged, exploded, perspective view of spool drag actuating structure on the reel of FIG. 1 according to the present invention;

DETAILED DESCRIPTION OF THE PREFERRED EMBODIMENT

Figure 3:
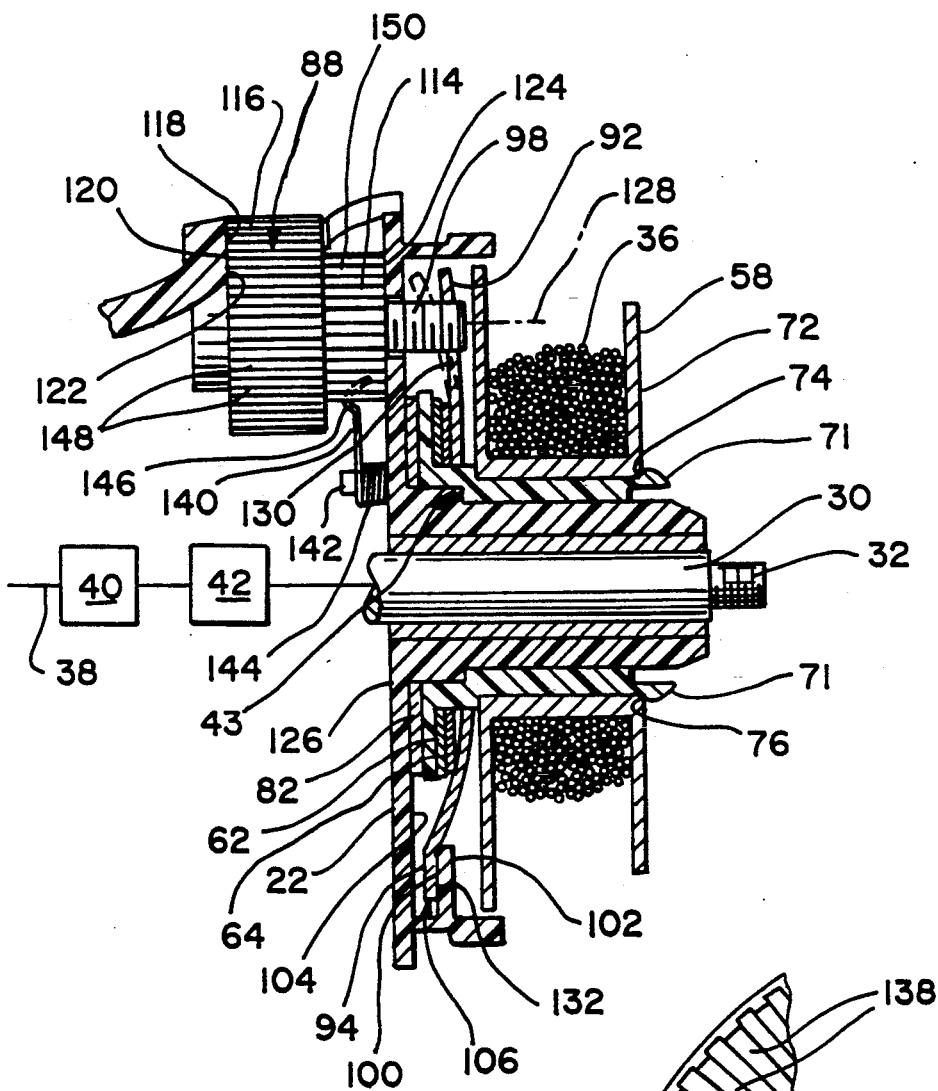
FIG. 3 is an enlarged, cross-sectional view of the drag actuating structure according to the present invention in an operative state.

In FIG. 1, a spin cast style fishing reel, of the type suitable for incorporation of the present invention, is shown at 10. The reel 10 consists of a housing 12 which encases an internal operating mechanism shown in detail in FIGS. 2 through 4. The housing 12 consists of a rear cover part 14 and a cup-shaped rearwardly opening front cover part 16, which is removably joinable to the rear cover part 14. The rear cover part 14 has an integral stem 18 for mounting the reel 10 to a fishing rod 20.

The rear cover part 14 has a deck plate 22 and a forwardly projecting support sleeve 24 for a line carrying spool 26, and a drag structure 28 therefor according to the present invention. A fore and aft center shaft 30 is journalled for rotation within the support sleeve 24 and has a forward free end 32 to which a spinner head 34 is threadably attached. The spool 26 and drag structure 28 are mounted on the support sleeve 24 to reside between the spinner head 34 and the deck plate 22, as described in detail hereafter. The spinner head 34 has a pickup pin (not shown) which wraps fishing line 36 around the spool 26 as the center shaft 30 and spinner head 34, carried thereon, are rotated about a fore and aft axis 38. Rotation of the center shaft 30 is effected by an external crank handle 40, through an intermediate gear mechanism, shown schematically at 42 in FIG. 3.

A spin cast style fishing reel, that is structurally similar to the reel 10, is shown in U.S. Pat. No. 4,408,729, to Moss et al. In the Moss et al. patent, a detailed description of the reel structure and the operation thereof is given. Consequently, detailed description of the basic overall reel operation is omitted herein, as an understanding of the same is not necessary to comprehend the present invention.

Figure 4:
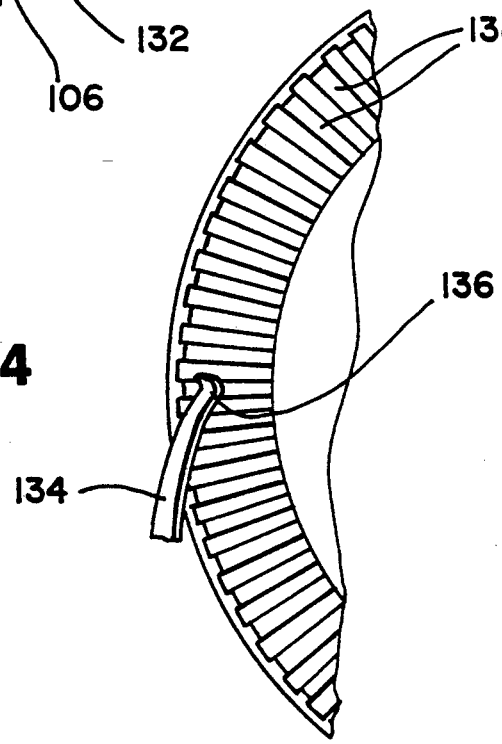
FIG. 4 is an enlarged, end view of a spool with clicker structure thereon to audibly alert a user that the spool is being rotated.

The present invention is concerned with the drag structure 28, shown in detail in FIGS. 2 through 4. The drag structure 28 is responsible for resisting rotation of the spool 26 with the reel 10 in the retrieve mode of FIG. 3. The drag structure 28 establishes the torque necessary to cause the spool 26 to rotate relative to the reel housing 12.

The spool 26 is part of a spool assembly 43 including a spool carrier 44. The spool carrier 44 has a radially enlarged flange 46 and a hub 48 with a through bore 50 to closely surround the support sleeve 24. The outer surface 52 of the carrier hub 48 has a non-circular cross-section, and in this case a hexagonal configuration, to be keyed to the spool 26 within a bore 54 having a matched cross-section. The spool 26 has a rear, disc-shaped flange 56 and a forward, disc-shaped flange 58 cooperatively bounding a line storage space 60.

The structure 43 is assembled by first attaching the spool carrier 44 to the support sleeve 24 and thereafter consecutively placing over the carrier hub a drag washer 62, a transition washer 64 and a drag clutch ring 66 and shifting the same axially toward the carrier flange 46. The carrier hub 48 has diametrically opposed, resilient fingers 68, 70 with ramp surfaces 71 which are compressed towards each other by the spool 26 to permit passage through the spool bore 54. Upon the hub 48 extending fully into the bore 54, the fingers 68, 70 project fully through and forwardly beyond the front wall surface 72 on the spool flange 58 and, upon so doing, spring back to an undeformed state which places rearwardly facing shoulders 74, 76 on the fingers 68, 70 in adjacent, confronting relationship to the spool surface 72. The spool 26 is thus releasably locked onto the carrier 44 with the drag elements 62, 64, 66 captively held in operative relationship between an axially rearwardly facing surface 78 on the spool flange 56 and an axially forwardly facing surface 80 on the carrier flange 46.

Before the spool carrier 44 is attached, a metal washer 82 is placed over the support stem 24 on the deck plate 22 and has an offset tab 84 which extends into a recess 86 in the deck plate 22 to limit rotation of the washer 82 about the fore and aft reel axis 38. The spool assembly 43 is secured to the reel housing 12 through the drag clutch ring 66, which also is operatively engaged with an actuator 88 used to adjust the reel drag.

The clutch ring 66 has an annular body 90 with diametrically opposed first and second parts 92, 94, respectively, projecting radially from the body 90. To operatively connect the drag clutch ring 66, the ring 66 is oriented with the first and second ring parts 92, 94 in substantial horizontal alignment i.e. with the ring 66 rotated clockwise in FIG. 2 through approximately 45°. With the washer 82 abutting the deck plate 22 and the carrier flange 46 abutting the washer 82, the first ring part 92 aligns axially with an undercut 96 on a fore and aft shaft 98 associated with the actuator 88. At the same time, the second ring part 94 resides behind a rearwardly facing surface 100 on a wall 102 that is forwardly offset from the forwardly facing deck plate surface 104. A seat/slot 106 is defined by the wall 102 for reception of the second ring part 94. By then rotating the ring 66 in a counter clockwise direction in FIG. 2, the second ring part 94 is moved into the seat 106 and simultaneously the undercut portion 96 of the shaft 98 is straddled by an edge 108 defining a U-shaped seat 110 in the first ring part 92. The width of the U-shaped seat 110 converges towards the base 112 of the U. As the ring 66 is rotated, the undercut portion 96 of the shaft 98 becomes progressively wedged into the seat 110. This represents the operative position for the ring 66 and associated spool assembly 43.

The actuator 88, to which the clutch ring 66 is operatively connected, consists of the aforementioned shaft 98 and an enlarged, stepped, knurled head 114, fixedly attached thereto. The head 114 has an enlarged portion 116 which is exposed through an opening 118 in the reel housing 12. Fore and aft shifting of the actuator 88 relative to the housing 12 is limited by a rearwardly facing shoulder 120 on the enlarged part 116, which abuts a forwardly facing shoulder 122 bounding the opening 118, and a forwardly facing shoulder 124 on the head 114 which abuts the rearwardly facing surface 126 of the deck plate 22.

The shaft 98 is threaded internally of the head 114. With the undercut 96 on the shaft 98 residing in the U-shaped seat 110, rotation of the shaft 98 is prevented. Preferably, the undercut 96 has one or more flat sides which are gripped and held against rotation by the edge 108. The user effects drag adjustment by rolling a finger along the knurled head 114 to thereby effect rotation of the head 114 about the fore and aft axis 128 of the shaft 98. One direction of rotation of the head 114 causes forward advancement of the shaft 98 relative to the head 114, while rotation of the head 114 oppositely thereto retracts the shaft 98. The first ring part 92 follows the fore and aft movement of the shaft 98.

FIG. 3 demonstrates the resulting drag adjustment. As the drag knob 114 is rotated to move the shaft 98 rearwardly, the first ring part 92 moves from the solid line position to the phantom line position. As this occurs, the rearwardly facing surface 130 on the drag ring 66 squeezes the carrier flange 46 with a progressively increasing force between the washer 82 on the rear side thereof and the washers 62, 64 on the front side thereof. An offset end 132 on the second ring part 94 abuts the surface 100 of wall 102 and firmly supports the second ring part 94 as the first ring part 92 is bent rearwardly to squeeze the carrier flange 46.

It can be seen that the drag and spool assemblies can be simply assembled according to the present invention. The spool carrier 44 can be slid over the support stem 24 with the washers 62, 64 and clutch ring 66 after which one turns the clutch ring 66 slightly to simultaneously anchor the second ring part 94 to the deck plate 22 and operatively engage the first ring part 92 with the actuator shaft 98. The spool 26 can then be snap fit to the spool carrier 44. Disassembly can be conveniently accomplished by reversing the above steps.

The drag structure 28 can be made sufficiently compact that other reel mechanisms can be incorporated into the reel. For example, in the reel 10 a flexible arm 134 is press fit to the deck plate 22 and has a V-shaped nose 136 at its free end to ride in and out of serrations 138 on the rear spool surface 78 to produce an audible clicking noise indicative of the spool rotation.

A clicker spring 140 is also attached to a boss 142 on the deck plate 22 to simultaneously prevent free rotation of the actuator head 114 and produce an audible clicking noise in response to rotation of the knurled head 114 in either direction. The clicker spring 140 has a plurality of turns 144 surrounding the boss 142, with one leg thereof (not shown) loaded against the deck plate back wall 126 and an opposite free end 146 riding in and out of grooves 148 on an integral outer surface of the head 114 on a reduced diameter portion 150 thereof.

I claim:

1. In a fishing reel of the type having a housing with a deck plate and a spool support sleeve projecting from the deck plate, a line carrying spool assembly mounted on the support sleeve and having a central axis and an associated flange with an axially facing surface, said spool assembly being rotatable relative to the housing to allow payout of line from said spool assembly, and means for producing a variable drag force on the spool assembly to control the torque that must be exerted on the spool assembly to effect rotation thereof relative to the frame, said drag producing means comprising:

a clutch ring having an axially facing surface;

means for mounting the clutch ring to the deck plate so that the spool assembly flange resides between the deck plate and at least a first part of the clutch ring; and means for urging the first part of the clutch ring selectively towards and away from the spool assembly flange to selectively increase and decrease a captive force on the spool assembly flange developed between the spool assembly flange and first part of the clutch ring to thereby vary torque that must be exerted on the spool assembly to effect rotation thereof, wherein the clutch ring surface faces axially rearwardly, the clutch ring mounting means include a wall defining a clutch ring slot and an axially rearwardly facing slot surface and a second part of the clutch ring resides in the slot axially rearwardly of the rearwardly facing slot surface.

2. The fishing reel of claim 1 wherein said first and second clutch ring parts are in diametrically opposed relationship.

3. The fishing reel of claim 2 wherein the clutch ring urging means cooperates with the first clutch ring part.

4. The fishing reel of claim 3 wherein the first clutch ring part has a U-shaped seat, the clutch ring urging means includes an axially movable shaft with an undercut thereon, and with the U-shaped seat on the first clutch ring part and undercut in axial alignment, rotation of the clutch ring in one direction about the spool assembly axis engages the undercut and shaft to operatively connect the first clutch ring part and clutch ring urging means and rotation of the clutch ring oppositely to the one direction disengages the first clutch ring part and clutch ring urging means.

5. The fishing reel of claim 4 wherein said clutch ring slot and second clutch ring part are relatively positioned so that as the clutch ring is rotated to engage the undercut and seat the second clutch ring part moves into the clutch ring slot and rotation of the clutch ring to disengage the undercut and seat causes the second clutch ring part to move out of the clutch ring slot.

6. The fishing reel of claim 5 wherein the spool assembly consists of a spool carrier and a spool, said spool carrier having a hub surrounding the spool support sleeve and defining the spool assembly flange, whereby the reel drag force is developed independently of the spool.

7. The fishing reel of claim 6 wherein cooperating means are provided on the spool and spool carrier for releasably connecting the spool and spool carrier, said cooperating means including manipulable means on the spool carrier projecting axially forwardly beyond the spool for releasing the spool from the spool carrier.

8. In a fishing reel of the type having a housing and a spool assembly mounted on the housing, said spool assembly being rotatable relative to the housing about an axis to allow line to pay out of the spool, means for producing a variable drag on the spool assembly, said variable drag producing means comprising:

a clutch ring having spaced first and second parts;

a drag actuator for selectively repositioning the first part of the clutch ring to vary reel drag; and cooperating means on the second clutch ring part and the reel housing and the first clutch ring part and actuator for simultaneously operatively engaging the actuator and first clutch ring part and housing and second clutch ring part as an incident of the clutch ring being aligned axially relative to the reel housing in an assembly position and rotating the clutch ring about the spool axis in a first direction, said clutch ring being disengageable by rotating the clutch ring in a direction opposite to the first direct relative to the housing,
wherein the cooperating means on the second clutch ring part and housing comprises a deck plate with a wall defining a slot for the second clutch ring part.

9. The fishing reel of claim 8 wherein said drag actuator includes a shaft and the cooperating means on the actuator and first clutch ring part comprises an undercut in the drag actuator shaft and a U-shaped seat in the first clutch ring part for straddling the undercut in the shaft on the drag actuator.

10. The fishing reel of claim 9 wherein said U-shaped seat in the first clutch ring part has a width that converges towards the base of the U so that the undercut is progressively wedged into the U-shaped seat.

11. The fishing reel of claim 10 wherein said clutch ring has an annular body and the first and second clutch ring parts project radially outwardly from the annular clutch ring body at diametrically opposite locations thereon.

12. The fishing reel of claim 11 wherein said clutch ring body and first clutch ring part each have a flat configuration with opposite surfaces residing in parallel planes.

13. The fishing reel of claim 12 wherein said second clutch ring part has a part that is offset from the space bounded by the parallel planes of the opposite clutch ring surfaces.

14. The fishing reel of claim 9 wherein said drag actuator shaft extends substantially parallel to the spool assembly shaft and the thickness of the first part of the clutch ring defining said U-shaped seat is approximately equal to the axial extent of the actuator shaft undercut.

15. The fishing reel of claim 8 wherein the spool assembly has flange with an axially facing surface and the drag actuator urges the first part of the clutch ring selectively towards and away from the spool assembly flange.

16. The fishing reel of claim 15 wherein the spool assembly consists of a spool carrier defining said spool assembly flange and a spool mounted to the spool carrier.

* * * * *